US009558608B2

(12) United States Patent
Amdahl

(10) Patent No.: US 9,558,608 B2
(45) Date of Patent: Jan. 31, 2017

(54) ELECTRONIC LOCKER RIGHT ACQUISITION VIA AN EXTERNAL SYSTEM

(71) Applicant: Smarte Carte, Inc., St. Paul, MN (US)

(72) Inventor: Keith Louis Amdahl, Minneapolis, MN (US)

(73) Assignee: Smarte Carte, Inc., St. Paul, MN (US)

( * ) Notice: Subject to any disclaimer, the term of this patent is extended or adjusted under 35 U.S.C. 154(b) by 0 days.

(21) Appl. No.: 14/539,913

(22) Filed: Nov. 12, 2014

(65) Prior Publication Data

US 2016/0133075 A1 May 12, 2016

(51) Int. Cl.

| | |
|---|---|
| ***G07C 9/00*** | (2006.01) |
| ***H04N 7/14*** | (2006.01) |
| ***G07F 17/12*** | (2006.01) |
| *G07F 17/14* | (2006.01) |
| *G07F 17/10* | (2006.01) |
| *G07F 5/26* | (2006.01) |

(52) U.S. Cl.

CPC ....... *G07C 9/00912* (2013.01); *G07C 9/00571* (2013.01); *G07F 17/12* (2013.01); *G07F 5/26* (2013.01); *G07F 17/105* (2013.01); *G07F 17/14* (2013.01)

(58) Field of Classification Search

CPC ............ G07C 9/00571; G07C 9/00039; G07C 9/00166; G07C 9/00817; G07C 9/00912; G07C 9/00896; G07F 17/12; G07F 5/26; G07F 17/105; G07F 17/14; G06Q 30/0645; G06Q 20/385; Y10T 70/70; G06K 7/01

See application file for complete search history.

(56) References Cited

U.S. PATENT DOCUMENTS

| | | | |
|---|---|---|---|
| 4,698,630 | A | 10/1987 | Ellsberg |
| 5,169,222 | A | 12/1992 | Bollore et al. |
| 5,231,272 | A | 7/1993 | Mardon |
| 5,345,379 | A | 9/1994 | Brous et al. |
| 5,894,277 | A | 4/1999 | Keskin et al. |
| 5,946,660 | A | 8/1999 | McCarty et al. |
| 6,185,773 | B1 | 2/2001 | Goedde |
| 6,655,180 | B2 | 12/2003 | Gokcebay et al. |
| 6,694,217 | B2 | 2/2004 | Bloom |
| 6,791,450 | B2 | 9/2004 | Gokcebay et al. |

(Continued)

FOREIGN PATENT DOCUMENTS

| | | | |
|---|---|---|---|
| EP | 2 685 032 | A2 | 7/2013 |
| EP | 2 693 407 | A1 | 7/2013 |

*Primary Examiner* — Dionne H Pendleton

(74) *Attorney, Agent, or Firm* — Merchant & Gould P.C.

(57) ABSTRACT

A locker rental system includes electronic lockers centrally managed by a locker manager. The locker manager is in communication with a separate external system, which handles admissions and sales for a venue. Users are provided with a unique external identification (ID) code for purposes such as admission to the venue. Determinative sequences of the external ID codes are provided to the locker manager as validation codes. When the external ID code is scanned, the locker manager validates the external ID code using the validation codes. A valid external ID code may be used to rent and access lockers in the locker system. In some implementations, locker rights may be sold through the external system and details of the transaction provided to the locker manager. If the external ID code is valid, the locker manager generates a rental plan.

17 Claims, 8 Drawing Sheets

(56) References Cited

U.S. PATENT DOCUMENTS

| | | | |
|---|---|---|---|
| 6,806,807 B2 | 10/2004 | Cayne et al. | |
| 6,879,243 B1 | 4/2005 | Booth et al. | |
| 6,999,825 B2 | 2/2006 | Inomata | |
| 7,176,782 B2 | 2/2007 | Shitan | |
| 7,477,132 B2 | 1/2009 | Mayer et al. | |
| 8,410,901 B2 | 4/2013 | Mullin et al. | |
| 8,854,184 B2 | 10/2014 | Mullin et al. | |
| 8,854,185 B2 | 10/2014 | Mullin et al. | |
| 8,892,463 B2 | 11/2014 | Mullin et al. | |
| 8,990,110 B2 | 3/2015 | Mullin et al. | |
| 2002/0180582 A1 | 12/2002 | Nielsen | |
| 2005/0040931 A1 | 2/2005 | Shitan | |
| 2005/0068178 A1 | 3/2005 | Lee et al. | |
| 2005/0179349 A1 | 8/2005 | Booth et al. | |
| 2005/0190037 A1 | 9/2005 | Shitan et al. | |
| 2009/0033456 A1 | 2/2009 | Castillo et al. | |
| 2009/0141117 A1* | 6/2009 | Elberbaum | H04N 7/186 348/14.04 |
| 2010/0198650 A1* | 8/2010 | Shaw | A01M 31/002 463/42 |
| 2011/0320372 A1* | 12/2011 | Woodard | G07C 9/00571 705/313 |
| 2013/0119129 A1* | 5/2013 | Amdahl | G06Q 20/385 235/381 |
| 2014/0035721 A1* | 2/2014 | Heppe | G07C 9/00571 340/5.54 |
| 2014/0316918 A1 | 10/2014 | Zaniker et al. | |
| 2015/0102711 A1 | 4/2015 | Zaniker et al. | |
| 2015/0179006 A1* | 6/2015 | Von Zurmuehlen | G07C 9/00039 340/5.54 |

* cited by examiner

ELECTRONIC LOCKER RIGHT ACQUISITION VIA AN EXTERNAL SYSTEM

BACKGROUND

Some venues (e.g., amusement parks, theme parks, water parks, etc.) make lockers available to guests. The lockers may be used to store possessions while the guest is visiting the venue. In some instances, guests may use lockers on an ad hoc basis. For example, an amusement park may provide complimentary, short term, single re-entry lockers to store backpacks, cameras, concessions, and other carried items while guests are on a ride where such items are not permitted. In other instances, guests may choose to rent a locker for an extended period to store items as a convenience. For example, water park guests may rent a locker with no re-entry restrictions in order to have a secure place to store clothes, towels, keys, purses, wallets, phones, snacks, or other items left unattended while enjoying the water park attractions. Unrestricted re-entry allows guests the freedom to access the encoded items as needed throughout the day (e.g., to obtain a dry towel or money to buy food).

Controlling access to lockers in large, high traffic venues presents unique challenges. Venue lockers, particularly those with short term, specific purpose locker rights (e.g., ride lockers), have high turnover and are used by an ever-changing assortment of guests. Issuing temporary physical keys (e.g., wristbands, keycards, etc.) to guests adds to the venue overhead in a high turnover environment. Biometric access systems (e.g., fingerprint scanning) and other keyless technologies are more complex and inconsistent scans issues may leave guests unable to retrieve stored items. It is with respect to these and other considerations that the present invention has been made.

BRIEF SUMMARY

According to some aspects of the disclosure, a locker rental system includes electronic lockers centrally managed by a locker manager. The locker manager may be in communication with a separate external system, which handles admissions and sales for a venue. Users are already provided with a unique or semi-unique external identification (ID) code for purposes other than locker rentals, such as admission to the venue. The locker rental system allows these external ID codes to be used for locker access. Further, the locker rental system allows the external system to initiate the sale of locker rights linked to external ID codes.

The locker rental system includes the locker manager, one or more locker terminals, and one or more lockers. Each locker is in communication with the locker manager via a locker terminal. The locker manager provides locker management functionality including, but not limited to, authenticating requests to access lockers, associating external ID codes with locker rights, tracking locker usage, and, optionally, sending signals or messages controlling access to lockers (e.g., unlocking lockers).

The locker terminal generally provides a local user interface for accessing lockers. Aspects of the locker terminal include a code entry device. A locker is accessed by scanning or manually entering the external ID code using the code entry device. The locker terminal request access to a locker by sending the external ID code and other pertinent to the locker manager. If authorization is received from the locker manager, the locker terminal selectively unlocks the lock of the authorized locker.

The locker manager stores a listing of locker accounts purchased or otherwise activated by users. Each locker account is configured to store information relating to the acquired locker rights. As lockers are rented, the locker manager associates user accounts with locker accounts to define rental plans. Each rental plan includes at least one locker account. In some implementations, the locker manager stores a listing of validation codes against which external ID codes may be compared to verify that the external ID code is authorized for use by the locker manager.

The external system is able to initiate the sale of locker rights based on external ID codes, allowing revenue to be tracked in real time on the external system. The external system interfaces with the locker rental system to cause the creation of locker rights linked to the external ID codes. Once the sale transaction is completed, users may immediately utilize the external ID codes to access lockers via the locker rental system.

The external ID code is any unique or semi-unique identifier associated with the external system that is normally provided to users for purposes other than to access the locker rental system. Initially, discriminative sequences within the external ID codes are identified and stored as validation codes, which may be used to verify that an external ID code is genuine. The external ID codes are issued to users on encoded items and have specific functionality in the external system.

The external system receives the external ID code, for example, via a point-of-sale terminal. The point-of-sale terminal determines if the external ID code is supplied in conjunction with a request for locker rights. If locker rights are requested, the point-of-sale terminal sends an activation request to the locker manager. The locker manager determines that the external ID code is valid and, optionally, that the requested locker rights are allowed for that external ID code. If valid, the locker manager activates the external ID codes, user accounts, and/or the locker accounts. Activation may include linking the external ID codes or user accounts with the locker accounts in a rental plan. The locker manager notifies the external system that the external ID code has been activated in the locker rental system. After receiving notice, the external system completes the locker right sale transaction and updates the records of the external system.

Some implementations of the locker rental system may allow use of external ID codes without a sale of locker rights initiated by the external system. For example, a venue may provide complimentary locker usage to users in certain situations with access to an external ID code. To access a complimentary locker, a user enters the external ID code at the locker terminal providing local control of one or more electronic lockers. If the external ID code has not been activated for use in the locker rental system, the locker terminal may generate an activation request causing the locker manager to attempt to activate the external ID code and/or the requested locker rights.

Following activation, an access request causes the locker manager to determine if the requested access is in accordance with a rental plan associated with the external ID code. The locker manager retrieves any relevant rental plans by comparing the external ID code in the access request to the external ID codes or user accounts associated with the rentals plans. The locker manager then evaluates the properties of the relevant locker accounts against the information supplied in the access request or obtained generally. If the access request satisfies a relevant rental plan, the locker manager authorizes access to the locker. If access is approved but a locker has not been selected or previously assigned, the locker manager selects an appropriate locker and associates the locker identifier for the selected locker with the locker account. Finally, upon receipt of authorization from the locker manager, the locker terminal unlocks the assigned locker allowing the user to store or retrieve items.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

A locker rental system includes electronic lockers centrally managed by a locker manager. The locker manager is in communication with a separate external system, which handles admissions and sales for a venue. Users are provided with a unique external identification (ID) code for purposes such as admission to the venue. Determinative sequences of the external ID codes are provided to the locker manager as validation codes. When an external ID code is scanned, the locker manager validates the external ID code using the validation codes. A valid external ID code may be used to rent and access lockers in the locker system. In some implementations, locker rights may be sold through the external system and details of the transaction provided to the locker manager. If the external ID code is valid, the locker manager associates the locker rights with the external ID code.

Figure 1:
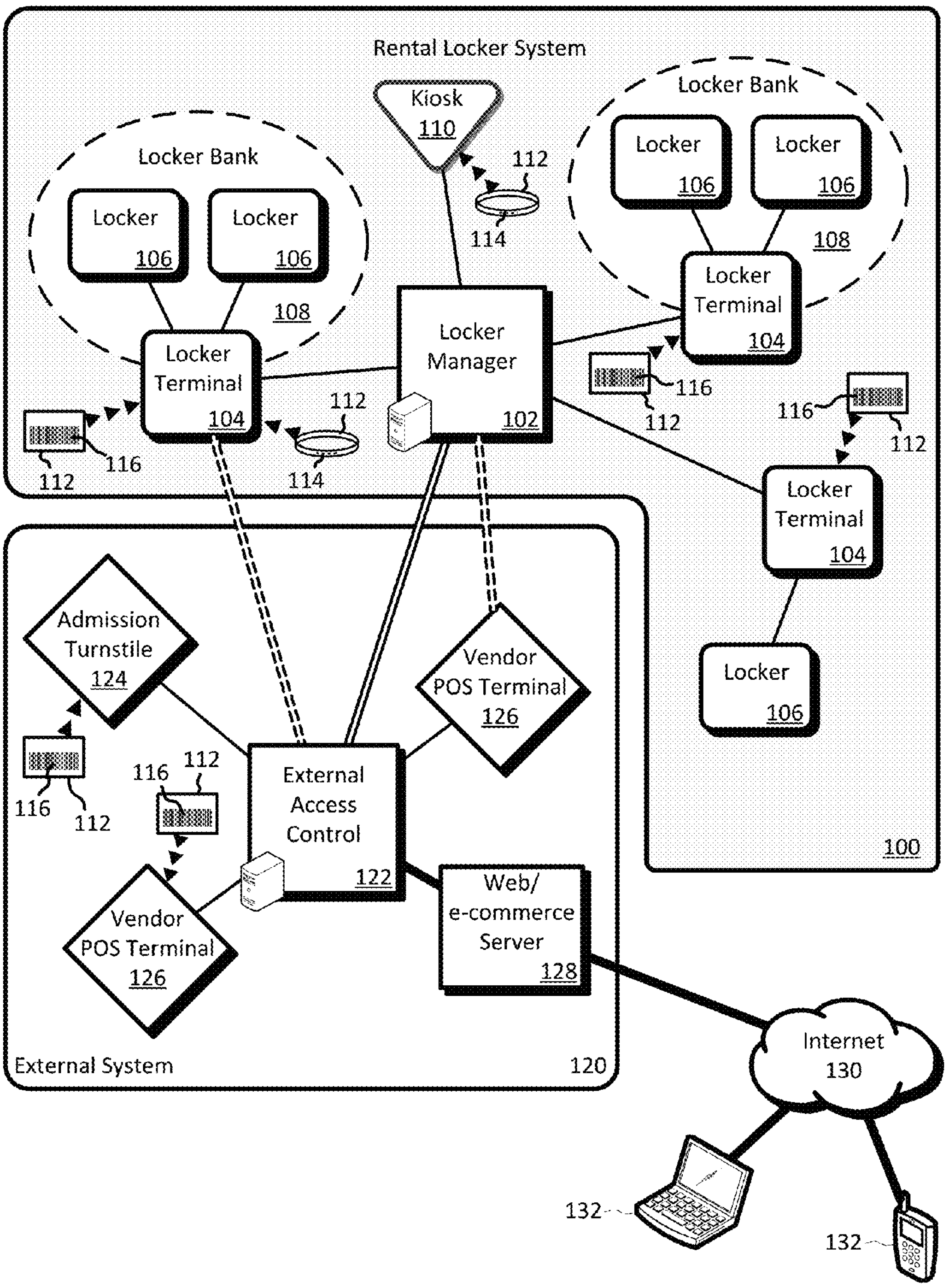
FIG. 1 is a schematic diagram of an exemplary implementation of a locker rental system used in conjunction with an external system operated by a venue.

FIG. 1 is a schematic diagram of an exemplary implementation of a locker rental system used in conjunction with an external system operated by a venue. The locker rental system 100 allows external ID codes 116 associated with the external system 120 to be used for locker access. Further, the locker rental system 100 allows the external system 120 to handle the sale of locker rights providing access to lockers 106 using external ID codes 116.

The locker rental system 100 includes the locker manager 102, one or more locker terminals 104, and one or more lockers 106. Each locker 106 is in communication with the locker manager 102 via a locker terminal 104. Multiple lockers 106 may be grouped together in a locker bank 108 and controlled by a single locker terminal 104. Individual lockers 106 may have their own dedicated locker terminal 104.

The locker manager 102 provides locker management functionality including, but not limited to, authenticating requests to access lockers, associating external ID codes with locker rights, tracking locker usage, and, optionally, sending signals or messages controlling access to lockers (e.g., unlocking lockers).

The locker terminal 104 generally provides a local user interface for accessing lockers 106. The locker terminal 104 is responsible for communications with and is responsive to the locker manager 102. In some implementations, the locks 210 are remotely controlled by or in response to commands from the locker manager 102 via the locker terminal 104 (i.e., a host-client relationship). In other implementations, each locker terminal 104 locally manages access to the associated locker(s) 106 based on centralized information obtained by the locker terminal 104 from the locker manager 102 and notifies the locker manager 102 about locker transactions to keep the centralized information current (i.e., a peer relationship).

Optional locker rental system kiosks 110 allow users to rent lockers directly from the locker rental system 100. In some implementations, the locker rental system kiosks 110 dispense an encoded item with a unique or semi-unique locker access code 114. For example, the locker access code 114 may be a barcode printed on a wristband.

As previously mentioned, the illustrated implementation shows the locker rental system 100 in communication with a representative external system 120 that does not provide locker rental management. By way of a non-limiting example, a venue (e.g., a theme park or an amusement park) may operate an external access control system 122 that provides centralized monitoring, management, hosting, accounting, and control of various aspects of the venue operations such as park admission via admission turnstiles 124 and vending via point-of-sale (POS) terminals 126. Other types of external systems 120 may provide more or less functionality. Another example of an external system 120 is a hotel operating a registration system that manages access to rooms via electronic keycards assigned to hotel guests.

The locker manager 102 is configured to utilize the unique or semi-unique external ID codes 116 provided to users for purposes other than locker rental and, optionally, the locker access codes 114. The external ID codes 116 are often associated with encoded items 112, such as, without limitation, admission tickets, keycards, wristbands, identification cards, and passes provided to users. The encoded item 112 may be provided either physically (e.g., a printed ticket) or electronically (e.g., an e-ticket displayable using a mobile phone or tablet). The external ID codes 116 may be written to or on the encoded items 112 in a machine readable format, a human readable format, or both (e.g., stored as a digital code or printed as a barcode).

Various implementations of the locker rental system 100 and/or the external system 120 provide various ways for users to rent lockers. Some implementations may allow users to rent lockers and/or redeem locker rental vouchers at selected external (e.g., venue-operated) point-of-sale terminals 126. Examples of suitable point-of-sale terminals 126 include, but are not limited to, vendor-operated and self-service transaction terminals located at stores and kiosks around the venue. The point-of-sale terminals 126 and/or the external access control system 122 may run a vending module or other software component to handle locker rights sale transactions. The point-of-sale terminals 126 may communicate transaction details (e.g., the locker rights acquired) to the locker manager 102 directly, as indicated by the broken double line, or indirectly via the external access control system 122. For example, the locker manager 102 may expose an application programming interface (API) or a communication protocol that allows the external access control system 122 and/or the point-of-sale terminals 126 to request activation of external ID codes 116 in the locker manager 102 and notify the locker manager 102 of new or modified locker rights associated with active external ID codes 116. In some implementations, the locker terminals 104 may also provide point-of-sale terminal functionality and may communicate transaction details (e.g., payment information) to the external access control system 122 either directly, as indicated by the broken double line, or indirectly through the locker manager 102. Some implementations allow locker rights to be purchased from a website (e.g., the venue website) hosted by a web/e-commerce server 128 associated with the locker rental system 100 and/or the external system 120 via the Internet 130 or other network using a client device 132 (e.g., a laptop computer, tablet, or smartphone).

Consider the case of a theme park offering complimentary ride lockers to all guests for certain rides. The nominal cost to provide a wristband with a locker access code to each guest who utilizes the ride lockers is between $0.03 and $0.07 per wristband and is in addition to the cost of the park admission ticket. However, by utilizing the locker rental system 100 described herein to provide locker access using the external ID code on the park admission ticket, the theme park can provide locker rights to users without the additional recurring supply cost. Alternatively, rather than issuing locker access codes 114 to all guests, the external access code 116 may be used to issue encoded items 112 to only those users who desire a locker.

The external ID code 116 is any unique or semi-unique identifier associated with an external system 120. External ID code 116 may be alphabetic, numeric, alphanumeric and may vary in length. External ID codes 116 are provided to users for any purpose other than to access the locker rental system 100. In some instances, the entire external ID code 116 is predetermined, and the validation codes may be complete external ID codes 116. In some instances, only a base portion of the external ID code 116 is predetermined, and the validation codes are the base portions of external ID codes 116. In other words, external ID codes 116 may include fixed code sequences (a prefix, a suffix, and/or a mid-portion) common to blocks of external ID codes 116 together with a unique code sequence. By way of a non-limiting example, an amusement park admission ticket may have a 26-digit code with a non-unique or semi-unique six-digit prefix followed by a unique 20-digit code. In other instances, the external ID codes 116 generated by the external system 120 are sequential codes, non-duplicative random or pseudo-random codes, or other unique or semi-unique codes generated on demand where the external ID codes 116 themselves do not contain any predetermined or otherwise distinct portion, but have other characteristics (e.g., code length or pattern) that may be used to authenticate the external ID codes 116.

Typically, the external ID code 116 is in the form of a machine readable code suitable for automated entry to make high volume authentication convenient and efficient. For example, the external ID code 116 may be encoded in various machine readable forms, including, but not limited to, a barcode, a magnetic strip, and a radio frequency identification tag. However, a human readable code entered manually is also suitable for use with the method described herein. Likewise, a combination of automated and manual entry (e.g., a machine readable external ID code used with a manually entered pin) may also be used, for example, to provide an additional layer of security.

Moreover, different external ID codes may have different locker access rights or capabilities. For example, the theme park may offer an admission ticket upgrade or a special pass that allows guests to use an express line with reduced wait times. The external ID codes associated with the upgraded admission ticket or special pass may also be linked to additional locker rights (e.g., upgraded ride lockers or complimentary general use lockers). Similarly, key cards from select hotels may be used to provide guests with complimentary general use lockers at a nearby theme park and/or to rent lockers at the hotel pool.

As previously mentioned, some implementations offer the ability to purchase upgraded or add additional locker rights from the external system 120 (i.e., using the park's existing external access control system 122). Because point-of-sale terminals 126 are typically plentiful and easy to locate in a theme park, the locker rental system 100 described herein allows the venue to make purchasing locker rental rights convenient for guests.

The ability to access lockers using an external ID code 116 does not depend upon the ability to purchase upgraded or additional locker rights from the external system 120. In implementations, where the sale of locker rights is not available through the external system 120, park visitors may choose to rent a locker and receive a locker access code 114 issued by the locker rental system 100. However, even when the external system 120 cannot be used to purchase locker rights on-site, external ID codes 116 may still be used to access lockers using predetermined (e.g., complimentary lockers) and/or pre-purchased locker rights.

The locker manager 102, locker terminals 104, locker rental system kiosks 110, the external access control system 122, and other components of the locker rental system 100 and the external system 120 are in communication via one or more private networks (e.g., wide area networks or local area networks) or direct electrical connections. In a typical example, the various components of the locker rental system 100 and the external system 120 are linked over a wired or wireless communication network. Additionally, components of the locker rental system 100 and the external system 120 may be hardwired together using cables or electrical wires. In some implementations, the locker rental system 100 is on a separate network from the external system 120. In other words, the locker terminals 104 and other locker rental system 100 may be exclusively in communication with the locker manager 102 while the venue point-of-sale terminals 126 other external system components may be exclusively in communication with the external access control system 122, and the locker manager 102 and the external access control system 122 are linked or otherwise in communication to provide a bridge between the two networks. In various implementations, selected components are connected to both networks. For example, a locker terminal 104 or a vendor point-of-sale may be linked to both the locker manager 102 for access control and the external access control system 122 for purchasing locker rights.

It is not necessary that the locker rental system 100 and the external system 120 be in direct communication. For example, a guest registration system from an affiliated hotel may not be in direct communication with a locker rental system 100 in an amusement park. Instead, information from the guest registration system may be transferred through an intermediary and loaded into the locker rental system 100 allowing the locker manager to recognize external ID codes 116 read from hotel keycards.

The locker manager 102, the external access control system 122, the client device 132, and other components such as locker terminals 104, kiosks 110, and point-of-sale terminals 126 may be implemented, in whole or in part, as specific purpose computing devices including, at least, a processor, memory, and a communication interface (e.g., a wired or wireless network interface). Such computing devices may optionally include a user interface having one or more input devices (e.g., keypads or touchscreens) and/or one or more output devices (e.g., video displays or speakers) as necessary. For example, the locker manager 102 and the external access control system 122 may be implemented as servers. The components of the locker rental system 100 and the external system 120 may be implemented in independent distributed architectures. The distributed components may be in communication over one or more networks, such as, but not limited to, local area networks, wide area networks, or the Internet via appropriate communication interfaces.

Figure 2:
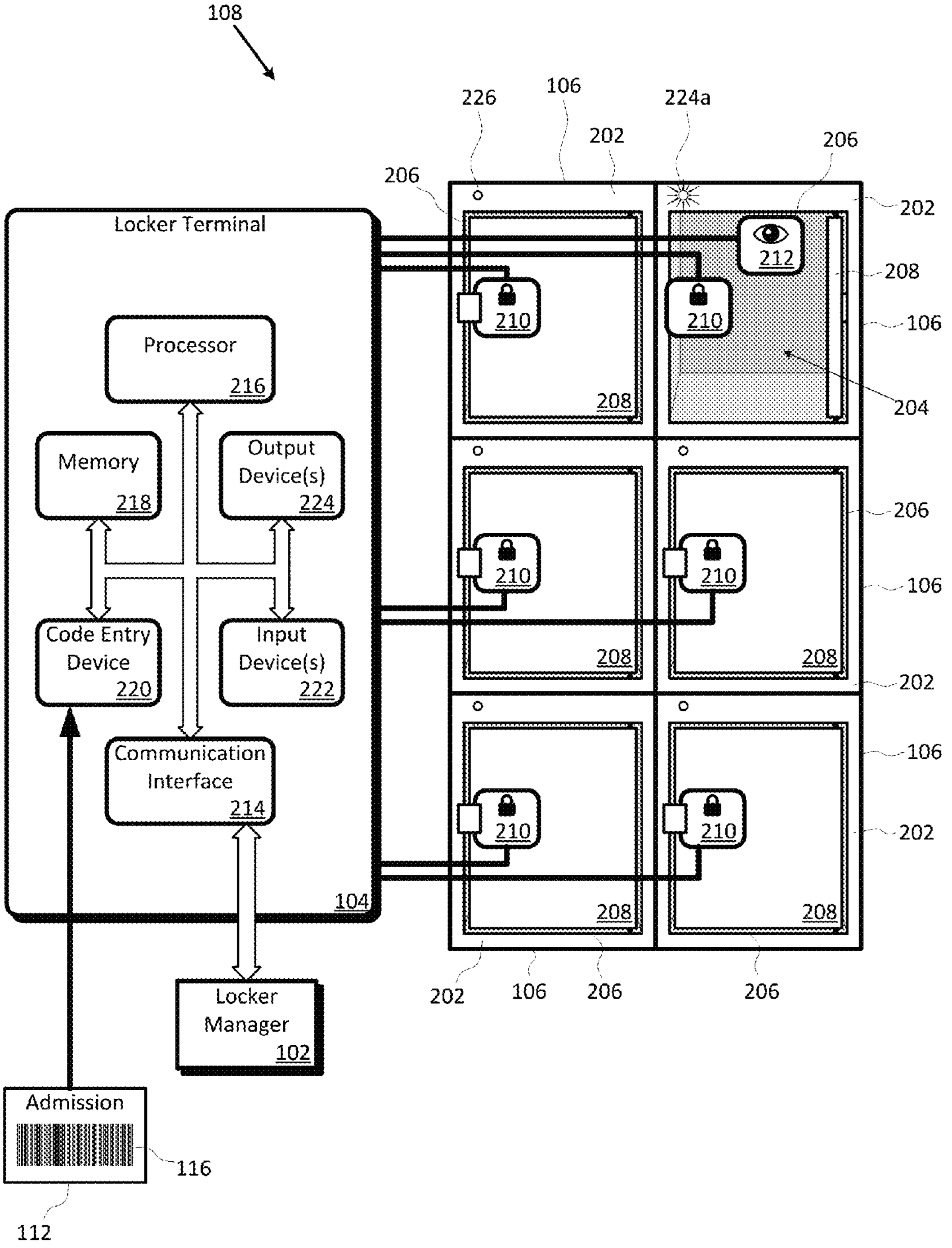
FIG. 2 is a block diagram of a representative locker bank suitable for use with the locker rental system described herein.

FIG. 2 is a block diagram of a representative locker bank suitable for use with the locker rental system described herein. The locker bank 108 includes one or more lockers 106 and at least one locker terminal 104. Each locker 106 includes an enclosure 202 has an interior 204 that is accessible through an opening 206 defined by the enclosure 202. Each locker 106 includes a door 208 that is moveable between a closed position and an open position. For example, the door 208 may pivot between the open position and the closed position. When in the closed position, the door 208 substantially blocks the access opening 206 to inhibit access to the enclosure interior 204. When in the open position, the door 208 does not block the access opening 206 enabling free access to the enclosure interior 204. Each locker 106 also includes an electromechanically actuated lock 210 in communication with the locker terminal 104. The lock 210 is configured to secure the door 208 in the closed position when engaged and to release the door 208, allowing the door to move freely between the open and closed positions when disengaged. The lockers 106 may optionally include one or more sensors 212 in communication with the locker terminal 104 to detect selected conditions and provide information about the locker state. For example, the lockers 106 may include a door position sensor to determine whether the locker door 208 is open or closed or an occupancy sensor to determine whether the locker 106 is in use (i.e., whether any physical objects are located within the enclosure 202).

In the illustrated implementation, the locker terminal 104 includes a communication interface 214, a processor 216, memory 218, and a code entry device 220. The communication interface 214 allows the locker manager 102 to communicate with other devices and systems, such as, but not limited to, the locker manager 102. The processor 216 and memory 218 cooperatively store and execute machine instructions to provide the functionality of the locker terminal described herein.

The code entry device 220 reads or scans a machine readable external ID code 116 from the encoded item 112 or allows users to manually enter a human readable external ID code 116 or an additional security code, such as a personal identification number (PIN). Examples of suitable code entry devices 220 for reading machine readable external ID codes 116 include, but are not limited to, barcode readers, magnetic strip readers, radio frequency identification tag readers, scanners, and cameras. Examples of suitable code entry devices 220 for entering human readable external ID codes 116 include, without limitation, keypads, keyboards, and touchscreens. Various implementation of the locker terminal 104 include additional input devices 222, which may be used for entry of additional information relating to a locker transaction, such as a locker number or payment information. Examples of additional input devices include, without limitation, keypads, keyboards, touchpads, touchscreens, credit card readers, and microphones.

A locker 106 is accessed by scanning or manually entering the external ID code 116 from the encoded item 112 using the code entry device 220. The locker 106 communicates with the locker manager 102 to determine whether access to the locker 106 is authorized. If authorization is received from the locker manager 102, the locker terminal 104 selectively unlocks the lock 210 of the assigned locker 106.

In some implementations, the locker terminal 104 includes one or more optional output devices 224 via which information may be presented to users. Various implementations employ visual indicators (e.g., display screens or lamps) and/or audio output transducers (e.g., speakers) depending upon the types and amount of information to be conveyed.

Display screens may be used to visually communicate written or pictorial information about the locker bank 108 and/or individual lockers 106, such as the number of available lockers 106, usage instructions, the location of the available lockers 106, and the status of one or more lockers 106. Some implementations provide information, such as the number and location of available lockers, only for the lockers 106 associated with the locker terminal 104. In some implementations, display screens may be used to provide information about other locker banks 108. For example, the display screen may identify other locker banks 108 with available lockers 106 using a locker bank identifier (e.g., bank B) and/or a map of the venue showing the location of the locker banks 108 with available lockers 106. Optionally, the number of lockers 106 available at the other locker banks 108 may also be shown. Audio output transducers allow information, such as the number of available lockers 106 or usage instructions to be announced (e.g., spoken). Lamps 226, such as light emitting diode (LED) lamps and similar visual indicators, associated with each locker 106 may be lit to signal simple information, such as locker status for individual lockers 106.

Locker status indications include whether the locker 106 is available, rented, occupied, reserved, disabled, damaged, locked, or unlocked and whether the allotted rental period has expired or a grace period is active. An example of a grace period is period of extra time allocated for a locker rental beyond the specified rental period communicated to the renter. The availability of a grace period may not be guaranteed and may depend on whether there is immediate need for the locker 106. A locker 106 is reported as being available if it is not associated with a purchased locker right and is not necessary to fulfill a purchased locker right (e.g., is not the only available locker of the type/size purchased). A locker 106 is reported as being rented if the locker 106 is associated with a purchased locker right or is necessary to fulfill a purchased locker right. In some implementations, the locker 106 is occupied if the locker 106 has been accessed under a purchased locker right. A locker 106 is reported as being occupied if a sensor 212 detects an item stored in the locker 106. A locker 106 is reported as being disabled if the locker 106 has removed from service (e.g., for cleaning or repair). A locker 106 is reported as being damaged if diagnostics indicate a problem with the locker (e.g., the door 208 fails to close or the lock 210 fails to lock or unlock). A locker 106 is reported as being reserved if the locker 106 is being held for a specific user, set aside for users having a privilege or special needs, or needed to fulfill existing rental obligations. A locker 106 is reported as being locked or unlocked based on the state of the lock 210. Other types of information may be communicated using the output devices 224.

While an exemplary implementation locker bank 108 with multiple lockers 106 controlled by a single locker terminal is shown 104, other implementations provide a separate locker terminal 104 for each locker 106. In some instances, the locker terminal 104 may be integrated with the lock 210.

Figure 3:
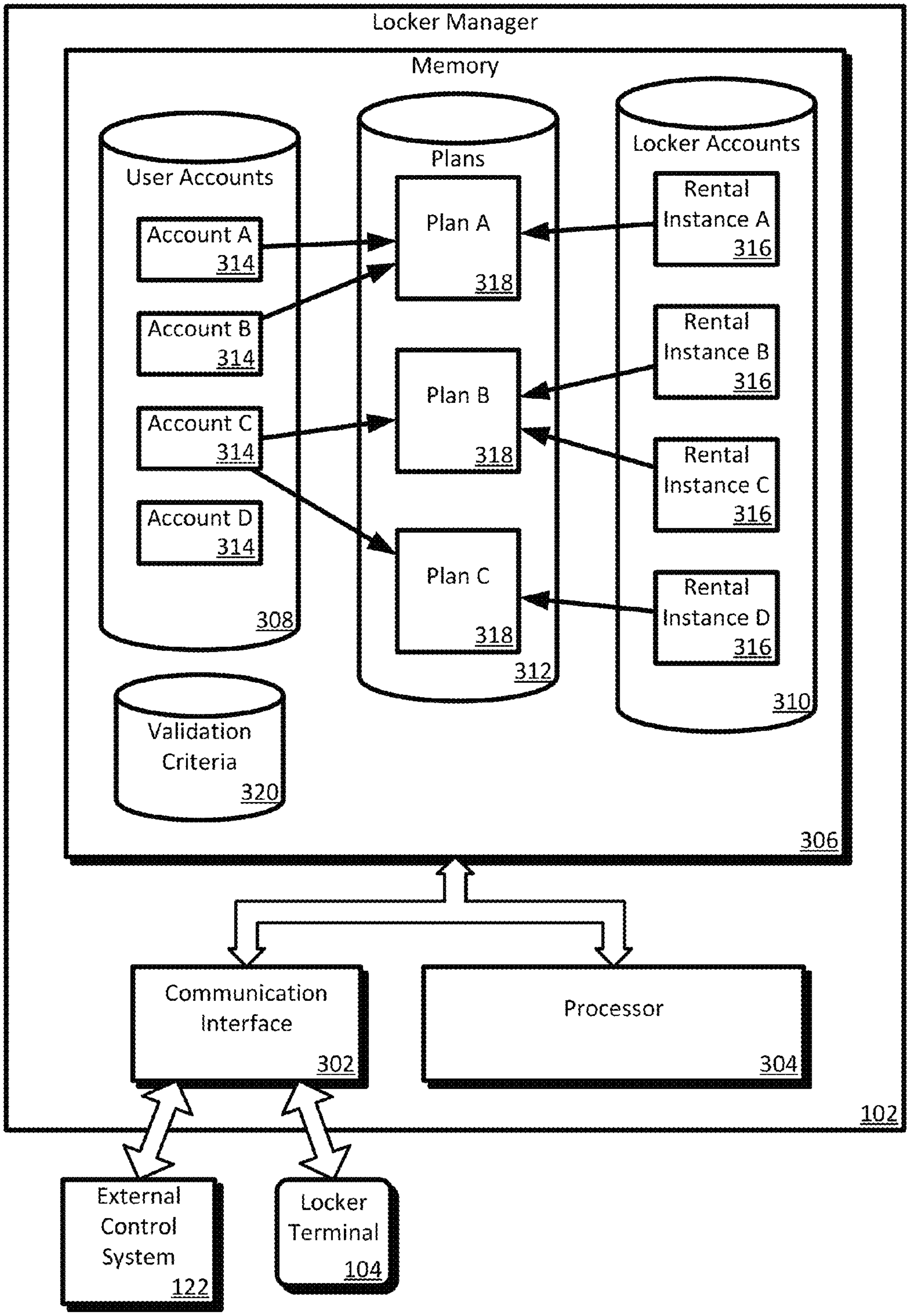
FIG. 3 is a block diagram of an exemplary implementation of a locker manager suitable for use by the locker rental system described herein.

FIG. 3 is a block diagram of an exemplary implementation of a locker manager suitable for use by the locker rental system described herein. In the illustrated implementation, the locker manager 102 includes a communication interface 302, a processor 304, and a memory 306. The communication interface 302 allows the locker manager 102 to communicate with other devices and systems, such as, but not limited to, the locker terminals 104 and the external access control system 122.

Various implementation of the locker manager memory 306 are configured with a user account memory 308, a locker account memory 310, and a rental plan memory 312. The user account memory 308 stores a listing of user accounts 314. As used herein with respect to the locker rental system 100, user accounts 314 are the external ID codes 116 stored or used by the locker manager 102, as opposed to being on an encoded item 112 or stored in the external system 120. Accordingly, the term "user account" and "external ID code" may be used interchangeably. Each user account 314 corresponds to an external ID code 116 associated with an encoded item 112 and may store additional information relating to the external ID code 116, such as activation status. In some implementations, the full external ID codes 116 are unknown to the locker rental system 100 until the external ID codes 116 have been submitted to the locker manager 102 for activation and user accounts 314 are only generated after the external ID codes 116 are validated (e.g., after being submitted by the external access control system 122, a point-of-sale terminal 126, a locker terminal 104, or a locker rental system kiosk 110). In such cases, the existence of a user account 314 may serve as the indication that the corresponding external ID codes 116 is active. In other implementations, the user account memory 308 is pre-populated with user accounts 314 for some or all available external ID codes 116 and each user account 314 includes a status that indicates whether the external ID code 116 has been activated and may be used to access a locker 106. In some implementations, the user account memory 308 may also store locker access codes 114 as user accounts 314 to allow locker rentals by users without an external ID code 116.

The locker account memory 310 stores a listing of locker accounts 316 purchased or otherwise activated by users. For example, each individual locker 106 or type of locker 106 being rented may be created as a separate locker account 316. Each locker account 316 is configured to store information relating to the acquired locker rights, such as, but not limited to, the locker type or rental duration.

As lockers are rented, the locker manager 102 associates stored user accounts 314 with locker accounts 316 to define rental plans 318, which are stored in the plan memory 312. Each rental plan 318 includes at least one locker account 316. Because a user may rent more than one locker 106 simultaneously, multiple locker accounts 316 may be associated with a single rental plan 318 in some implementations. Similarly, because multiple users may share a locker, multiple user accounts 314 may be associated with a single rental plan 318. A user account 314 or a locker account 316 may be associated with more than one rental plan 318. For example, a user may have a shared locker 106 with another user under one rental plan 318 and an individual locker 106 under a separate rental plan 318.

In some implementations, the locker manager memory 306 also includes a validation criteria memory 320. The validation criteria memory 320 is configured to store various validation criteria that may be used by the locker manager 102 to evaluate external ID codes 116 and verify that the external ID code 116 is recognized and valid (e.g., has or can be assigned locker rights). The validation criteria memory 320 may store a listing of validation codes, rules, parameters, or other information useable by the locker manager 102 to authenticate or validate external ID codes 116 and determine what rights are or may be associated with an external ID code 116.

Figure 4:
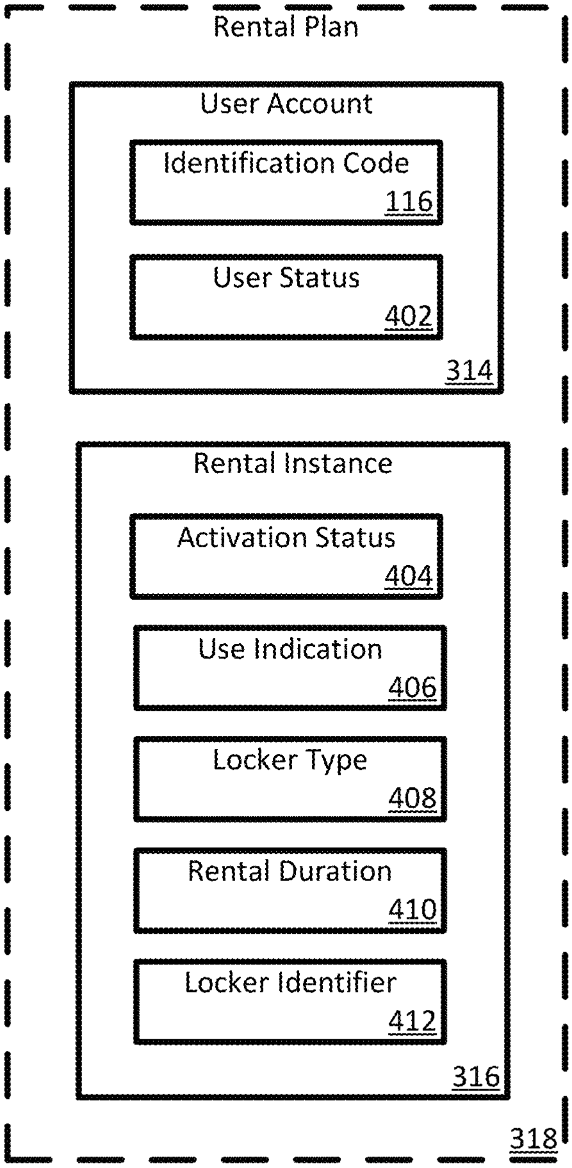
FIG. 4 is a block diagram of a representative rental plan suitable for use by the locker manager of the locker rental system.

FIG. 4 is a block diagram of one exemplary rental plan that may be stored in the memory of the locker manager. As previously mentioned, rental plans 318 associate user accounts 314 with locker accounts 316 to describe locker rights. Each rental plan 318 includes one or more locker accounts 316.

In the illustrated implementation, the user account 314 associated with the rental plan 318 stores the external ID code 116 and an optional user account status 402, which indicates whether the external ID code 116 has been activated in the locker rental system 100. Optionally, the user account status 402 may be used to indicate additional information about the external ID code 116. For example, the user account status 402 may indicate that the external ID code 116 is invalid, expired, reported stolen, and the like.

The locker manager 102 may associate multiple external ID codes 116 with the same rental plan 318. In some implementations, each external ID code 116 is associated with a different locker account 316 of the rental plan 318. For example, locker rights may be purchased for a group and each member of the group may receive a separate locker 106. In other implementations, two or more external ID codes 116 may be associated with the same locker account 316. Members of group (e.g., a family) may choose to rent one or more lockers that are each accessible by anyone in the group. In still other cases, a user may be part of a group and may choose to rent multiple lockers, some of which are accessible by selected individuals in the group. In some implementations, each external ID code 116 is associated with only one locker account 316.

For example, one rental plan 318 may include a first locker account 316 for a multiple re-entry water park locker 106 and a second locker account 316 for a single re-entry ride locker 106. The rental plan 318 may be associated with multiple external ID codes 116. One of the external ID codes 116 may be associated with only the first locker account 316, thereby enabling the user with the encoded item 112 bearing that external ID code 116 to access the water park locker 106. Another external ID code 116 may be associated with both the first locker account 316 and the second locker account 316, thereby enabling the user with the encoded item 112 bearing the other external ID code 116 to access both lockers 106.

The illustrated locker account 316 stores the locker activation status 404, a use indication 406, a locker type 408, a rental duration 410, and a locker identifier 412. In some implementations, the rental plan 318 includes a separate locker account 316 for each locker 106 that is rented by a user. In other instances, separate locker accounts 316 are only needed where the rights associated with each locker 106 are different. For example, two lockers 106 rented by a single user for a half-day with the right to access the locker 106 multiple times may be associated with a single locker account 316. A second locker account 316 may be added for a third locker 106 rented by the same user for a full-day with the right to access the locker multiple times.

The locker activation status 404 indicates whether a user has accessed a locker 106 in accordance with the locker account 316. The use indication 406 indicates whether the locker 106 is being rented for single re-entry or multiple re-entry type use.

The rental duration 410 indicates the time period during which the locker 106 may be accessed in accordance with the rental plan 318. For example, in the case of a multiple re-entry type locker 106, the rental duration 410 indicates whether the locker 106 is being rented for an hour, a day, a half-day, or for some other period of time. In other implementations, the rental duration 410 may indicate a maximum number of re-entries associated with the rental plan 318. In certain implementations, when the length of time indicated by the rental duration 410 expires, the user is charged additional money to re-enter the locker 106. In the case of a single re-entry type locker, the rental duration 410 may indicate the length of time the user has to access the locker 106 before incurring extra charges. In certain implementations, the length of time communicated to the user is less than the actual length of time specified by the rental duration 410 associated with the rental plan 318. For example, the rental plan 318 may include a grace period, or "mercy time," (e.g., five minutes, ten minutes, fifteen minutes, etc.) that offers a window of time after the stated rental time expires during which the user can remove stored items from the locker 106 without incurring extra charges.

The locker type 408 specifies the types of lockers 106 that may accessed under the rental plan 318. Rental plans 318 may specify different usage rules, and different implementations of the locker rental system 100 may handle rental plans 318 differently. The limitations of one locker account 316 may differ from the limitations of another locker account 316 of the same rental plan 318. For example, in some implementations, at least one of the use indication 406 and the rental duration 410 of a first locker account 316 may be different than the corresponding values of second locker account 316 of the same rental plan 318. In other implementations, two locker accounts 316 of the same rental plan 318 may have different locker types 408.

The locker type 408 or other properties may be used to implement locker rental restrictions or privileges, such as type, size, features, or location. In some implementations, locker accounts 316 may be associated with privileges. For example, some locker accounts 316 (e.g., an account for a child) may include an indication that the locker account 316 has priority to obtain a locker close to the ground or at a lower level of a bank 108. Some locker accounts 316 (e.g., an account for a VIP or club member) may include an indication that the locker account 316 has priority to obtain a priority locker (e.g., a large locker or a locker in a desirable location). Other locker accounts 316 may include an indication that the locker account 316 is authorized to obtain a locker that meets American Disability Act (ADA) specifications. If locker accounts 316 having priority to certain types of lockers 106 have been sold, then the locker manager 102 may deny access to one or more of these types of lockers 106 by a non-priority account-holder, even if the locker 106 otherwise meets the limitations of the rental plan 318.

Each locker account 316 is eventually associated with a locker identifier 412 that identifies a particular locker 106 in the locker rental system 100. In some instances, the locker identifier 412 is associated with the locker account 316 at the time the user requests access to a locker 106 in accordance with existing locker rental right, which causes a specific locker to be assigned to the user. For example, a user may purchase a right to select any available locker 106 and freely access the locker 106 during the rental period at a point-of-sale terminal 126, but a particular locker identifier 412 may not be specified at the time the locker right sale transaction occurs. Instead, the locker manager 102 associates a specific locker identifier 412 associated with the locker account 316 when the user exercises the right to access a locker 106. In other instances, a specific locker 106 may be assigned and the corresponding locker identifier 412 associated with the locker account 316 by the locker manager 102 at the time of the locker right sale transaction. Accordingly, each locker account 316 will have its own unique locker identifier 412 associated therewith.

Rental plans 318 may offer access to a single locker 106 or to multiple lockers 106. A rental plan 318 may be linked to one or more specific lockers 106, may allow free access to any available locker 106, or may allow free access to lockers 106 based on restrictive criteria, such as, without limitation, locker size, type, time, and location. For example, a rental plan 318 may allow a user to simultaneously utilize one large locker 106 and one medium locker 106 or one general locker 106 and one ride locker 106. In other cases, a user may choose to rent a water park locker 106 for the morning and a general park locker 106 for the afternoon. Or, a rental plan 318 may allow a user to access any available locker in certain locations, but not lockers in other locations.

In some implementations, the locker manager 102 may assign lockers 106 to the locker accounts 316 within a rental plan 318 in accordance with a predetermined pattern. For example, in some implementations, the locker manager 102 may assign the locker accounts 316 within the same rental plan 318 to lockers 106 located in a common area (e.g., at the same locker bank 108). In other implementations, the locker manager 102 may assign the locker accounts 316 within the same rental plan 318 to lockers 106 that are geographically spread out (e.g., to facilitate access by inhibiting the need to access adjacent lockers 106 simultaneously).

In various implementations, the locker accounts 316 may store additional information pertaining to the locker rights and/or some information may be omitted when unnecessary or redundant. For example, the locker type 408 may be unnecessary when there is no difference between lockers 106. Or, in another example, the locker activation status 404 may be omitted as redundant in an implementation that infers whether or not a locker account 316 is active based on the whether or not a locker identifier 412 is specified.

Figure 5:
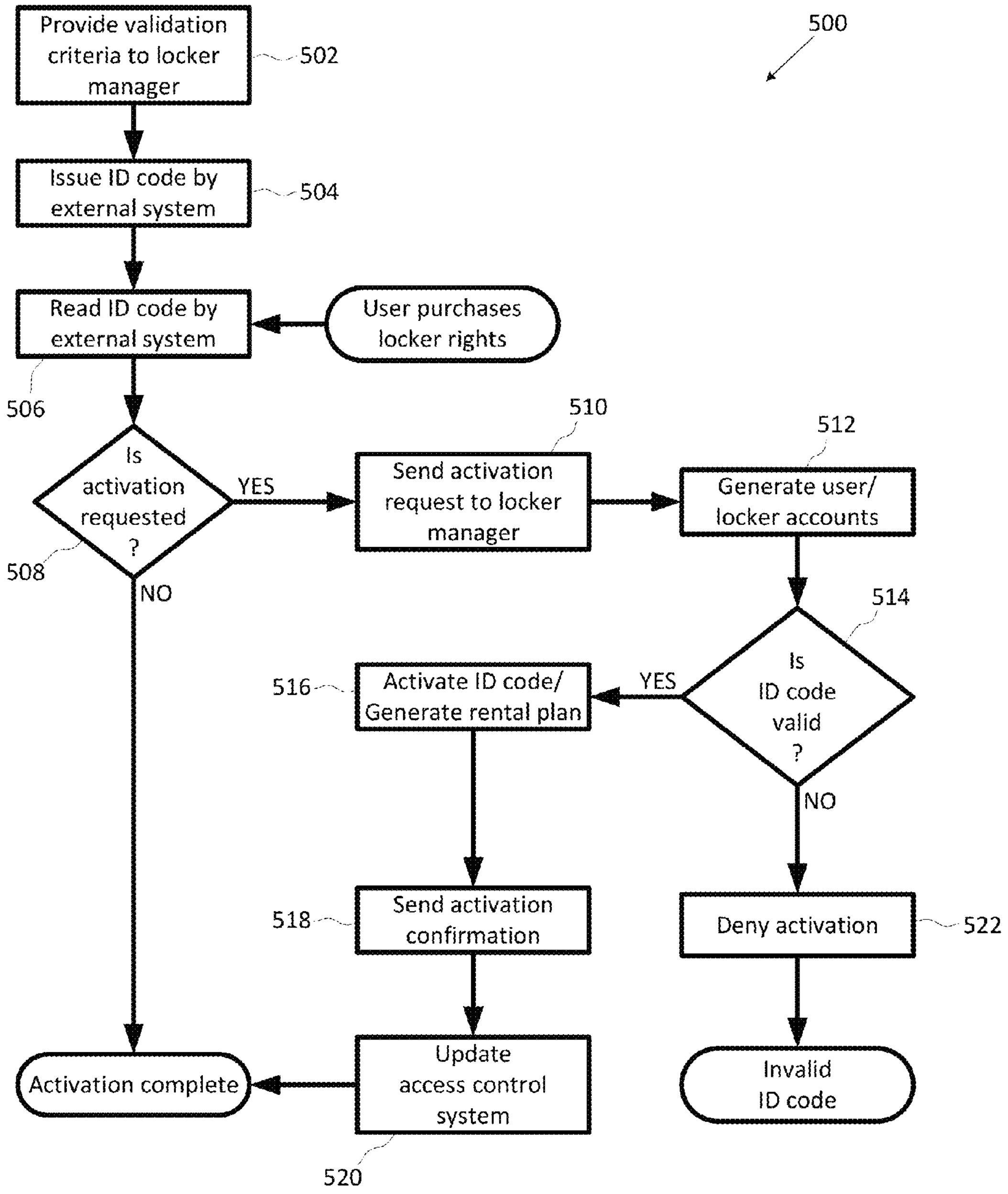
FIG. 5 is a flowchart of one implementation of an external system-initiated locker right sale phase of a method of managing locker access based on external ID codes.

FIG. 5 is a flowchart of one implementation of an external system-initiated locker right sale phase of a method of managing locker access based on external ID codes. The method 500 begins with a configuration operation 502 where validation criteria is provided to or configured in the locker manager 102. In some instances, the validation criteria includes a set of validation codes corresponding to external ID codes 116 that provide a basis for verifying the authenticity of the external ID codes 116. For example, the validation codes may be a set of prefixes used in external ID codes 116 or each full external ID code 116. In some instances, the validation criteria also provides information usable by the locker rental system 100 to determine what, if any, locker rights are or may be associated with the external ID codes 116. In some instances, the validation criteria include rules or parameters that provide information usable by the locker rental system 100 to determine whether to accept the external ID code 116. Such validation criteria may be implemented in various forms of evaluative logic such as, but not limited to, discrete comparisons or logic trees. By way of example, validation criteria such as the code length may be used for light authentication.

An external ID code generation operation 504 issues the external ID code 116 to a user. In various implementations, external ID codes 116 may be provided to users on encoded items 112 such as, but not limited to, park admission tickets, hotel room keys, boarding passes, vouchers, and wristbands.

In an external ID code entry operation 506, the external ID code 116 is supplied to the external system 120, for example, via a point-of-sale terminal 126. Some instances of the initial external ID code entry operation 506 occur when the user scans the encoded item 112 and a voucher at a locker terminal to claim locker rights purchased on-line prior to arriving at the venue. Other instances of the initial external ID code entry operation 506 may occur when a user scans the encoded item at a venue-operated point-of-sale system 126 as part of a locker right sale transaction while on-site at the venue.

A locker right request determination 508 determines if the external ID code 116 is supplied in conjunction with the creation of locker rights. In other words, the point-of-sale terminal 126 or the external access control system 122 determines whether the external ID code 116 is accompanied by a request to associate locker rights with the external ID code 116. For example, the external access control system 122 may determine that creation or modification of locker rights is being request based on the initiation of a locker right sale transaction at a point-of-sale terminal 126.

If creation or modification of new locker rights is requested, an activation request operation 510 initiated by the external system 120 sends an activation request to the locker manager 102 that includes the external ID code 116 associated with the locker right sale transaction and, optionally, pertinent details of the requested locker right (e.g., number of lockers, types of lockers, locker sizes, locker locations, rental durations, etc.), including any locker identifiers 412, if specific lockers 106 are identified during the locker right sale transaction. For example, the user interface at the point-of-sale terminal 126 may show locker status information obtained from the locker manager 102 and allow the operator to manually assign lockers 106.

Upon receiving the activation request, an account generation operation 512 is responsible for documenting details of the activation request in the memory 306 of the locker manager 102. In some implementations, if a corresponding user account 314 does not exist, the locker manager 102 creates a new user account 314 using the full external ID code 116 supplied in the activation request. Various implementation of the locker manager 102 may also document the locker rights by creating a new locker account 316 based on the information supplied in the activation request.

In a validity determination 514, the locker manager 102 validates the activation request. At a minimum, the locker manager 102 determines whether the external ID code 116 is valid (i.e., the external ID code 116 is a legitimate code). In some implementations, the locker manager compares the relevant portion of each entered external ID code 116 to the validation codes stored as validation criteria 320 to identify whether or not the external ID code 116 is legitimate (e.g., a recognized admission ticket barcode and not a UPC code from a soup can). When the external ID codes 116 are “smart” codes that include some embedded information that differentiates between different authorized external ID codes 116, the validity determination 706 may be more extensive and used to confirm that the requested locker rights are available for that external ID code 116. In other instances, when the external ID codes 116 are “dumb” codes that are not inherently identifiable or distinguishable (e.g., a fixed-length barcode employing sequential values), the validity determination 514 may simply validate and accept any external ID code 116 from the activation request that meets the validation criteria. For example, the validity determination 514 may accept any external ID code 116 from the activation request that is the proper length (e.g., eight-digits) or matches a specified pattern (e.g., three letters followed by five numbers).

If the activation request is valid (e.g., a match for the external ID code 116 is found), an activation operation 516 performed by the locker manager 102 marks the user accounts 314 and/or the locker accounts 316 as active in the locker manager memory 306. In other implementations, some or all of the user account 314 and locker account 316 creation functions of the request documentation operation 512 may be deferred until the activation request is determined to be valid. Some implementations may link the external ID codes 116 or user accounts 314 with the locker accounts 316 in a rental plan 318 as part of the activation operation 516. Thus, a rental plan 318 may be created in advance of the external ID code 116 being entered at a locker terminal 104.

In an activation confirmation operation 518, the locker manager 102 notifies the point-of-sale terminal 126 that the external ID code 116 has been activated in the locker rental system 100. Upon receipt of the activation confirmation, the point-of-sale terminal 126 completes the locker right sale transaction (if applicable) and updates the external access control system 122 with details, such as and without limitation, the purchase price and other locker right details upon receiving confirmation of activation of the external ID code 116 from the locker manager 102 as part of an external system update operation 520.

If no match is found during the verification operation 514 (i.e., the activation request is not valid), the user accounts 314 and/or locker accounts 316 may be deactivated, deleted, or flagged as invalid by an activation denial operation 522 performed by the locker manager 102. If the user accounts 314 and/or locker accounts 316 are already set to inactive, no further action is necessary, and the activation denial operation 522 completes the activation phase. Optionally, the locker manager 102 may send notice of the rejection (i.e., non-activation) to the external access control system 122 as part of the activation denial operation 522.

Figure 6:
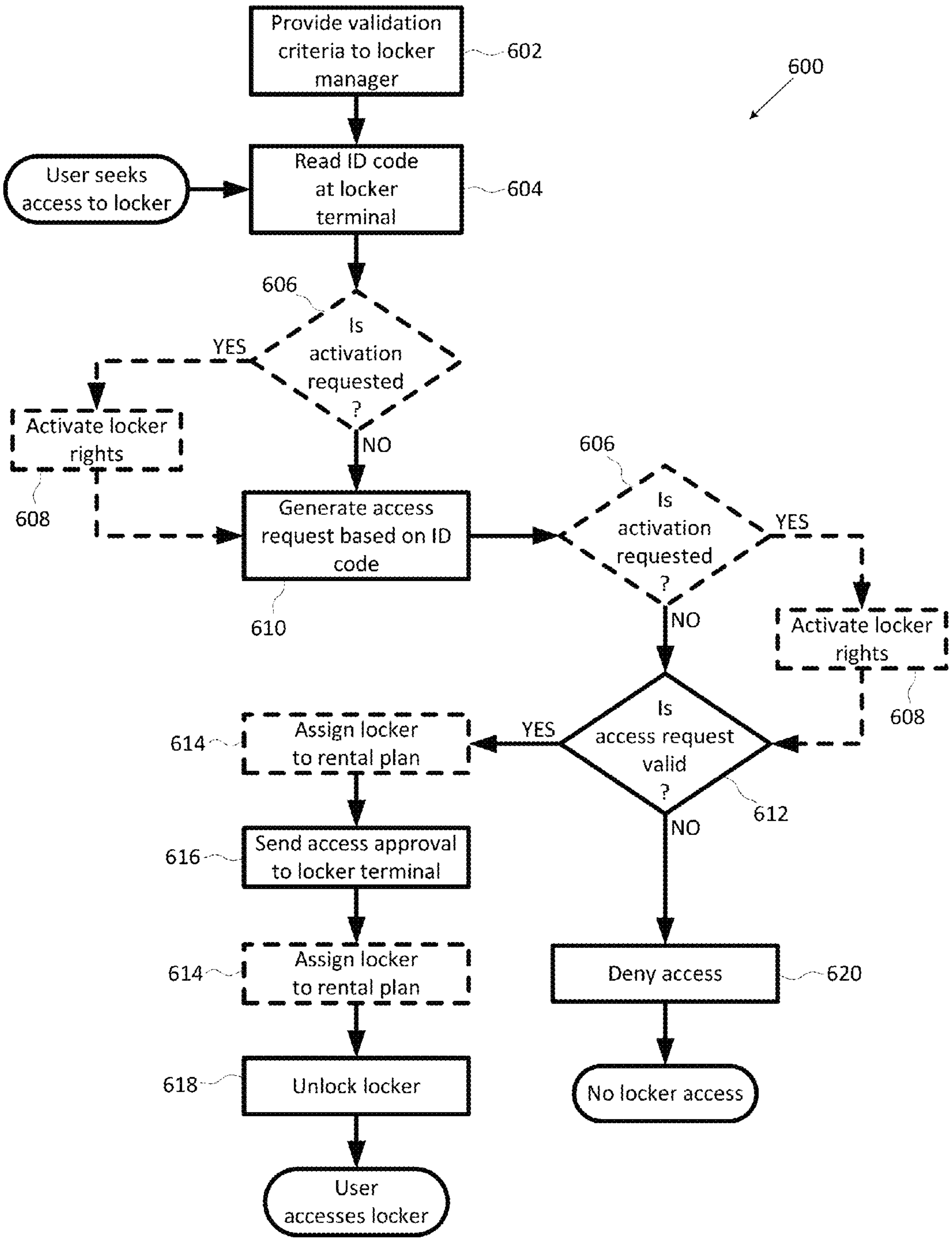
FIG. 6 is a flowchart of one implementation of a locker access phase of a method of managing locker access based on external ID codes.

FIG. 6 is a flowchart of one implementation of a locker access phase of a method of managing locker access based on external ID codes. The method 600 begins with a configuration operation 602 where validation criteria is provided to or configured in the locker manager 102. In some instances, the validation criteria includes a set of validation codes corresponding to external ID codes 116 that provide a basis for verifying the authenticity of the external ID codes 116. For example, the validation codes may be a set of prefixes used in external ID codes 116 or each full external ID code 116. In some instances, the validation criteria also provides information usable by the locker rental system 100 to determine what, if any, locker rights are or may be associated with the external ID codes 116. In some instances, the validation criteria include rules or parameters that provide information usable by the locker rental system 100 to determine whether to accept the external ID code 116. Such validation criteria may be implemented in various forms of evaluative logic such as, but not limited to, discrete comparisons or logic trees. By way of example, validation criteria such as the code length may be used for light authentication.

When a user seeks access to a locker 106 using the encoded item 112 at the locker rental system 100, the external ID code 116 is supplied to the locker rental system 100 in an external ID code entry operation 604. In one example, the external ID code 116 may be entered when amusement parks guests use admission tickets at a locker terminal 104 to utilize pre-purchased locker rights, for example, locker rights purchased via a point-of-sale terminal 126. The external ID code 116 may also be entered in conjunction with the use of a complimentary locker 106 or the contemporaneous purchase of locker rights via the locker terminal 104 or locker rental system kiosk 110.

In conjunction with entering the external ID code 116, implementations of the locker access method 600 may collect additional information, either directly or indirectly, from the user. For example, if each locker 106 has a separate locker terminal 104, the locker identifier 412 automatically becomes known when the external ID code 116 is entered via the code entry device 220 of the locker terminal 104 corresponding to the selected locker 106. Similarly, the user interface presented by the locker terminal 104 may allow the user to manually select a particular locker 106 to access. In lieu of selecting a particular locker 106, the user interface presented by the locker terminal 104 may allow the user to select the locker type 408.

Through the user interface, the user may indicate whether the locker access transaction is an initial entry into the locker 106 or a subsequent re-entry into the locker 106 via the user interface of the locker terminal 104. Further, the user interface may allow a choice of accepting complimentary locker rights or purchasing additional locker rights. Complimentary locker rights (e.g., ride locker rights) may have a rental duration 410 tied to the estimated wait time for the ride (e.g., 15 minutes longer than the estimated wait time) and cannot be changed by the user. However, the user may select the rental duration 410 when purchasing locker rights, rather than accepting complimentary locker rights. The user interface may allow the selection of a PIN that must be entered in addition to the external ID code 116 for added security. In some implementations, the PIN may be stored in the user account 314. In other implementations, the PIN may be stored in the locker account 316, allowing the user to select a separate PIN for each locker, if desired. Other information pertaining to the rental may be manually entered or automatically inferred.

When the external ID code 116 is entered at the locker terminal 104, the locker rights associated with that external ID code 116 may be in one of several different states. First, the external ID code 116 is unknown to the locker rental system 100. This may occur when the locker rental system 100 does not store all possible external ID codes 116 and only learns the external ID codes 116 actively used to rent lockers 106. Second, no locker rights have been defined. This may occur when no rental plan 318 associated with the external ID code 116 exists. Third, defined locker rights may be available but unused. This may occur when no locker identifier 412 is associated with a locker account 316 under a rental plan 318 linked to the external ID code 116. Fourth, defined locker rights may be in use. This may occur when a locker identifier 412 is associated with a locker account 316 under a linked rental plan 318. Other states (e.g., expired locker rights) may be exist.

Some states may be known or detectable to the locker terminal 104. Accordingly, an optional activation requested determination 606 to determine whether the locker access transaction includes a request for associate locker rights with the external ID code 116 based on information provided by user may be performed at the locker terminal 104. For example, if the locker terminal 104 determines that a locker access transaction involves the purchase or complimentary acquisition of new or updated locker rights or other situation where locker rights are not defined, the access method 600 may branch to an activation operation 608 similar to that described in relation to the activation method 500. If the locker access transaction involves the re-entry into a locker, the activation operation 608 may be bypassed. In various implementations, some of the additional information may be obtained after the validity of the external ID code has been verified and the external ID code 116 has been activated for use in the locker rental system 100.

Following the bypass or successful completion of the activation operation 608, the method 600 continues with an access request operation 610 where the locker terminal 104 generates an access request and sends it to the locker manager 102. The access request includes, at least, the external ID code 116 and the locker terminal identifier of the locker terminal 104 sending the access request. The locker terminal identifier and/or the locker identifier 412 may be used to direct responses back to the originating locker terminal 104. As previously described, a locker 106 may not have been allocated or selected prior to making an initial access request. In some instances, the locker identifier 412 may incorporate or be the equivalent of the locker terminal identifier and be used in place of a separate locker terminal identifier.

In some implementations, the locker terminal 104 does not determine if activation was requested. Instead, upon receipt of the access request, the locker manager 102 assumes responsibility for determining whether the external ID code requires activation before access may be granted and performs the activation request determination 606 and, if needed, the activation operation 608.

Following the bypass or successful completion of the activation operation 608, a validity determination 612 evaluates the validity of the access request. The locker manager 102 processes the access request to determine if the requested access is in accordance with a rental plan 318 associated with the external ID code 116. The locker manager 102 retrieves any relevant rental plans 318 by comparing the external ID code 116 in the access request to the external ID codes 116 (i.e., user accounts 314) associated with the rentals plans 318.

After the relevant rental plans 318 are identified, the locker manager 102 evaluates the properties of the relevant locker accounts 316 against the information supplied in the access request (e.g., the locker identifier 412 to determine if the request is for locker to which the user has rights) or obtained generally (e.g., the current time to determine if the rental has expired). For example, the locker manager 102 determines if the access request is within the rental duration (e.g., the time period or permitted number of locker entries). Or, for example, the locker manager 102 determines if the locker identifier 412 in the access request matches a locker identifier 412 associated with a locker account 316 of a relevant rental plan 318. If a locker identifier 412 is not specified, the locker manager determines if a locker 106 of the appropriate locker type 408 and/or in an authorized location is available in the lockers 106 linked to the locker terminal 104. These examples are not exhaustive, and other types and combinations of comparisons may be used to evaluate whether the requested access is in accordance with a relevant rental plan 318. If the access request satisfies a relevant rental plan 318, the locker manager 102 authorizes access to the locker 106.

If access is approved and the access request does not include a locker identifier 412 or a substitution for the requested locker 106 is needed, a locker assignment operation 614 is performed by some implementations of the locker manager 102. The locker assignment operation 614 selects a locker 106 satisfying the properties of the locker account 316 and assigns the locker 106 to the user. More specifically, the locker manager 102 associates the locker identifier 412 for the selected locker 106 with the locker account 316.

In an approval notification operation 616, the locker manager 102 sends a response notifying the locker terminal 104 that access is authorized. If the locker manger 102 assigned a locker 106, the response includes the locker identifier 412 to which access is authorized. The response may also include an instruction or command to unlock the specified locker 106.

If the response received by the locker terminal 104 does not include a locker assignment, the locker terminal 104 performs a locker assignment operation 614, as described above. Once the locker 106 is assigned, an unlock operation 618 electronically actuates the lock 210 of the assigned locker 106. In some implementations, the locker terminal 104 simply passes an unlock command from the locker manager 102 to the electromechanically actuated lock 210. In other implementations, the locker terminal 104 generates an appropriate signal to unlock the lock 210. If payment has not been received, the locker terminal 104 may collect payment prior to assigning or unlocking the locker 106.

Once the assigned locker 106 is unlocked, the locker access phase of the method 600 concludes with the user gaining access the assigned locker 106. If the access request determined to be invalid by the verification operation 610, an access denial operation 620 denies access to a locker 106 and, optionally, sends a message reporting that the access request is invalid to the locker terminal 104. Following the access denial operation 620, the locker access phase of the method 600 ends.

Figure 7:
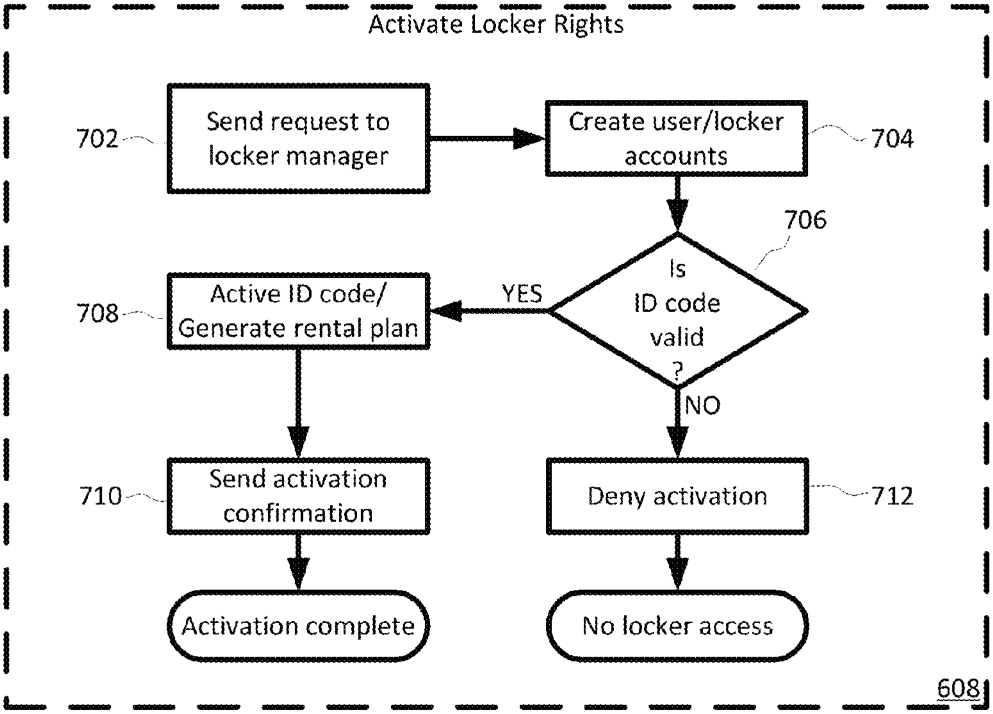
FIG. 7 is a flowchart of one implementation of the activation operation of the method of managing locker access based on external ID codes.

FIG. 7 is a flowchart of one implementation of the activation operation of the method of managing locker access based on external ID codes. The activation operation 606 begins with an activation request generation operation 702 where the locker terminal 104 sends an activation request to the locker manager 102. the request contains some or all of the pertinent details of the requested locker rights (e.g., the external ID codes associated with the locker right sale transaction, number of lockers, types of lockers, locker sizes, locker locations, and rental durations), including any locker identifiers 412 corresponding to lockers 106 selected by the user as part of the locker rights sale transaction or the locker access transaction.

Upon receiving the activation request, an account generation operation 704 is responsible for documenting details of the activation request in the memory 306 of the locker manager 102. In some implementations, if a corresponding user account 314 does not exist, the locker manager 102 creates a new user account 314 using the full external ID code 116 supplied in the activation request. Various implementation of the locker manager 102 may also document the locker rights by creating a new locker account 316 based on the information supplied in the activation request.

In a validity determination 706, the locker manager 102 validates the activation request. At a minimum, the locker manager 102 determines whether the external ID code 116 is valid (i.e., the external ID code 116 is a legitimate code). In some implementations, the locker manager compares each entered external ID code 116 or relevant portion thereof to the validation codes stored as validation criteria 320 to identify whether or not the external ID code 116 is legitimate (e.g., a recognized admission ticket barcode and not a UPC code from a soup can). When the external ID codes 116 are "smart" codes that include some embedded information that differentiates between different authorized external ID codes 116, the validity determination 706 may be more extensive and used to confirm that the requested locker rights are available for that external ID code 116. In other instances, when the external ID codes 116 are "dumb" codes that are not inherently identifiable or distinguishable (e.g., a fixed-length barcode employing sequential values), the validity determination 514 may simply validate and accept any external ID code 116 from the activation request that meets the validation criteria. For example, the validity determination 514 may accept any external ID code 116 from the activation request that is the proper length (e.g., eight-digits) or matches a specified pattern (e.g., three letters followed by five numbers).

If the activation request is valid (e.g., a match for the external ID code 116 is found), as part of an activation operation 708 performed by the locker manager 102 marks the user accounts 314 and/or the locker accounts 316 as active in the locker manager memory 306. In other implementations, some or all of the user account 314 and locker account 316 creation functions of the account generation operation 704 may be deferred until the activation request is determined to be valid. Some implementations may link the user accounts 314 with the locker accounts 316 in a rental plan 318 as part of the activation operation 708.

In a status notification operation 710, the locker manager 102 notifies the locker terminal 104 that the external ID code 116 has been activated in the locker rental system 100.

If the activation request is not valid (e.g., the external ID code 116 does not match a validation code or the length is wrong), the user accounts 314 and/or locker accounts 316 created by the account generation operation 704 may be deactivated, deleted, or flagged as invalid by an activation denial operation 712. If the user accounts 314 and/or locker accounts 316 are already set to inactive, no further action is necessary, and the activation denial operation 712 completes the activation phase. Optionally, the locker manager 102 may send notice of the rejection (i.e., non-activation) to the locker terminal 104.

While some actions are described herein as being taken by a certain component, it should be appreciated that the action may be performed by other components. For example, if the point-of-sale terminal 126 is implemented as a dumb terminal, determinations and other actions may actually be performed by the external access control system 122. Conversely, actions that are described as be performed by the external access control system 122 may be performed by a smart point-of-sale terminal 126. Similarly, the locker terminal 104 may perform actions that are described as being performed by the locker manager 102, or vice versa. Further, actions performed by the locker terminal 104 may also be performed by a locker rental system kiosk 110. Additionally, the locker terminals 104 and locker rental system kiosk 110 may interoperate with the external system 120.

Figure 8:
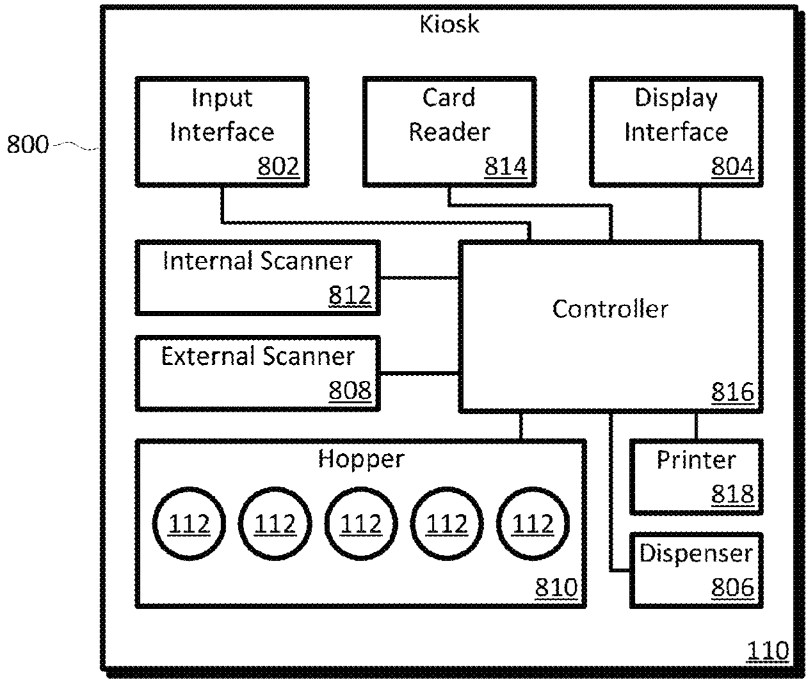
FIG. 8 is a block diagram of a representative kiosk suitable for dispensing encoded items usable with the locker rental system described herein.

FIG. 8 is a block diagram of a representative kiosk suitable for dispensing encoded items usable with the locker rental system described herein. The kiosk 110 includes a kiosk housing 800 including an input interface 802, a display interface 804, and a dispenser 806 through which encoded items 112 bearing locker access codes are dispensed. In various implementations, the input interface 802 includes a keypad, a mouse, a touch screen, a controller, buttons, and/or a microphone. The input interface 802 optionally includes an external scanner 808, such as an optical or a laser scanner. The external scanner 808 is configured to read encoded items 112. In various implementations, the display interface 804 of the kiosk 110 includes a monitor or other type of display screen arrangement, a haptic screen, a speaker arrangement, and/or a printer.

A hopper 810 also is disposed in the kiosk housing 800. The hopper 810 is configured to hold multiple encoded items 112. In some implementations, the encoded items 112 in the hopper 810 include locker access codes printed thereon that match locker access codes stored at the locker manager 102. However, the locker access codes printed on the encoded items 112 in the hopper 810 are not yet activated at the locker manager 102. In other implementations, the encoded items 112 in the hopper 810 do not include any locker access code information yet. In still other implementations, the encoded items 112 in the hopper 810 may include activated locker access codes printed thereon. The hopper 810 is connected to the dispenser 806 to selectively dispense the encoded items 112 in response to information entered into the input interface 802. An internal scanner 812 also is disposed in the kiosk housing 800. In some implementations, the internal scanner 812 is disposed at or adjacent the dispenser 806. In other implementations, the internal scanner 812 is disposed adjacent the hopper 810. In one example implementation, the internal scanner 812 is an optical scanner. In another example implementation, the internal scanner 812 is a laser scanner.

In some implementations, the user purchases locker rights at the kiosk 110. For example, the user may use the input interface 802 to select a number of lockers to be rented, the type of each locker to be rented, a duration for which the locker will be accessible to the user, and the number of people who should have access to each locker. The various options available to the user are presented (e.g., visually, audibly, or haptically) using the display interface 804. In some implementations, the kiosk 110 also includes an electronic card reader 814 disposed at the kiosk housing 800. The card reader 814 is configured to read a value-bearing card (e.g., a credit card, a debit card, a gift card, a voucher, etc.). In other implementations, the kiosk 110 is otherwise configured to accept money from a user (e.g., a coin slot, a dollar reader, a check reader, etc.).

In other implementations, the user redeems a voucher associated with a previously purchased rental plan 318 (e.g., by scanning or otherwise entering the locker access code or other indicia from the voucher via the input interface 802). For example, the user may purchase a rental plan 318 online via a park website and redeem the voucher for one or more encoded items at the kiosk 110. The user also may edit a previously purchased rental plan 318 at the kiosk 110 (e.g., to add another locker account 316, to increase the duration 409 for a particular locker account 316, to add a locker access code 114 to the rental plan 318, etc.).

The kiosk 110 also includes a controller (e.g., a processor and associated memory or other computing device) 816 disposed in the kiosk housing 800. The controller 816 is configured to receive an order (a new order or an existing order) via the input interface 802 and to selectively dispense the encoded items 112 via the dispenser 806 in accordance with the order. The controller 816 also is configured to scan a locker access code 114 of each encoded item 112 using the internal scanner 812 as the encoded item 112 is dispensed. The controller 816 communicates with the locker manager 102 to provide the scanned locker access code 114 from the dispensed encoded item 112 to activate the locker access code 114. Generally, scanning a specific external ID code 116 or locker access code 114 at an electronic locker 106 will not unlock a locker door 208 unless that specific external ID code 116 or locker access code 114 has been activated in the locker manager 102.

In some implementations, the encoded item dispensing kiosk 110 also includes an encoder 818 disposed in the kiosk housing 800. Examples of encoders 818 include, but are not limited to, printers, magnetic strip writers, and RFID writers. The encoder 818 prints or otherwise adds the respective locker access code 114 to each encoded item 112 as the encoded item 112 is dispensed from the kiosk housing 800. In some implementations, the encoder 818 adds visual indicia to the encoded item that includes the locker access code. In other implementations, the encoder stores the locker access code in an electronic memory included in the encoded item 112. In some implementations, the processor 816 selects a locker access code from a locally stored list of available locker access codes and provides the selected number to the encoder 818. In other implementations, the processor 816 requests an available locker access code from the locker manager 102 and provides the requested locker access code to the encoder 818.

Figure 9:
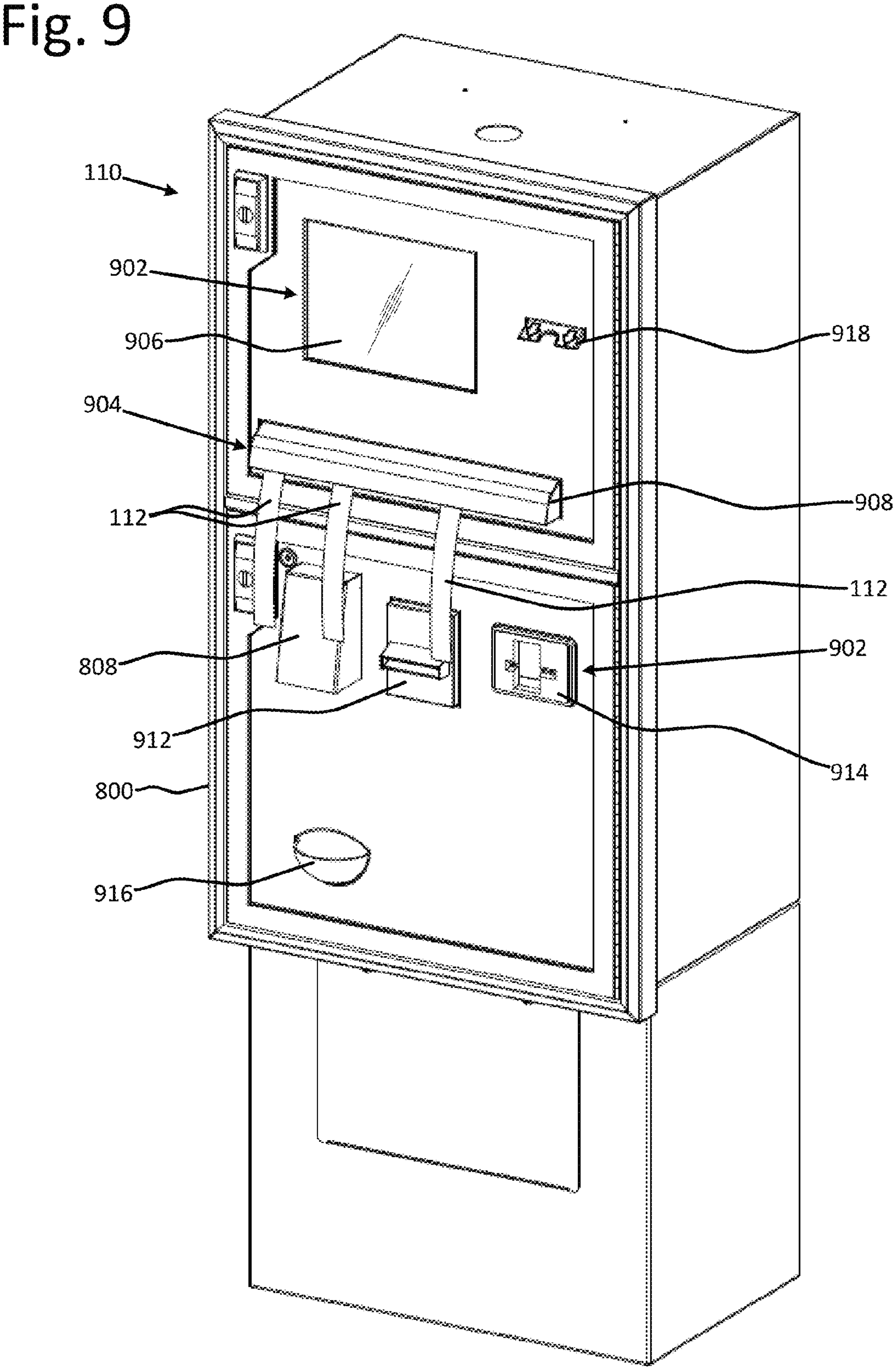
FIG. 9 illustrates a representative locker rental system kiosk suitable for dispensing physical locker keys usable with the locker rental system described herein.

FIG. 9 illustrates a representative locker rental system kiosk suitable for dispensing physical locker keys usable with the locker rental system described herein. The locker rental system kiosk 110 including a kiosk housing 800 having an input/output region 902 and a dispensing region 904. The kiosk housing 800 also defines a payment region 910. The input/output region 902 includes a display screen 906 and an input interface. In the example shown, the display screen 906 is a touchscreen via which users may enter input and receive output. Users may utilize the input/output region 902 to purchase, modify, or cancel locker rights. In other implementations, the input/output region 902 may include input controls that are separate from the display screen (e.g., buttons, keypad, mouse, keyboard, microphone, etc.).

The dispensing region 904 defines at least one slot through which one or more encoded items 112 (e.g., wristbands or card stock tickets) are meted out from one or more discharge devices in the interior of the kiosk housing 800. In the illustrated implementation, a guide 908 is positioned to direct the discharged encoded items 112 downwardly. In certain implementations, the guide 908 also inhibits unauthorized access to the discharge devices through the slot.

The kiosk housing 800 also has a payment region 910 including one or more payment acceptors. In the example shown, the kiosk housing 800 include a bill acceptor 912 and a card acceptor 914. The bill acceptor 912 is configured to receive paper money. The card acceptor 914 is configured to receive credit cards, debit cards, gift cards, membership cards, or other value bearing and/or identifying instruments. A coin tray 916 may be provided to allow the kiosk to dispense change. Some types of kiosk housings 800 also include an external scanner 808 (e.g., an optical scanner, a laser scanner, etc.) that is configured to read codes (e.g., bar codes, QR codes, alphanumeric codes, etc.) on coupons, receipts, purchase slips, or other media bearing readable codes.

A receipt dispenser 918 may print out a receipt for the user when the encoded items 112 are dispensed and/or when a refund is issued. In certain implementations, the receipt dispenser 918 is located near the input/output regions 902. In other implementations, the receipt dispenser 918 is located closer to the payment region 910.

The above specification, examples, and data provide a complete description of the manufacture and use of the composition of the invention. Since many implementations of the invention can be made without departing from the spirit and scope of the invention, the invention resides in the claims hereinafter appended.

What is claimed is:

1. A locker system operable with an encoded item issued to a user, each encoded item associated with an external identification (ID) code, the external ID code including a semi-unique portion and a unique portion, the semi-unique portion being a fixed sequence shared by multiple external ID codes, the unique portion being a sequence appearing in only one external ID code sharing the semi-unique portion, the external ID code originally provided to the user for a purpose other than to access the locker system, the external ID codes being associated with an external system including an external access control system in communication with a point-of-sale terminal including a code entry device allowing entry of external ID codes from the encoded items as part of a sale transaction, the locker system comprising:

a locker manager;

a locker having an electromechanically actuated lock; and a locker terminal in communication with the electromechanically actuated lock and the locker manager, the locker terminal comprising a processor, memory, and a code entry device for entering external ID codes from the encoded items, the locker terminal sending the external ID code entered when access to the locker is requested to the locker manager;

wherein the locker manager is in communication with the locker terminal and with the external system, the locker manager comprising a processor and memory, the memory storing validation codes, each validation code corresponding to at least a portion of one of the external ID codes, the locker manager receiving an activation request from the external system, the activation request generated during a sale of locker rights and comprising one of the external ID codes entered as part of the sale of locker rights with the unique portion of the external ID code being unknown to the locker manager prior to the locker manager receiving the activation request, the locker manager storing the external ID code from the activation request in the memory as an active external ID code if a corresponding portion of the external ID code from the activation request matches one of the validation codes, the locker manager determining whether to authorize access to one of the lockers based on a comparison of the external ID code received from the locker terminal to the active external ID codes.

2. The locker system of claim 1 wherein the activation request further comprises a description of the purchased locker rights, the locker manager generating a locker account based on the description of the purchased locker rights and storing the locker account in the locker manager memory if a corresponding portion of the external ID code from the activation request matches one of the validation codes.

3. The locker system of claim 2 wherein the locker manager associates the locker account with the external ID code from the activation request to create a rental plan, the locker manager storing the rental plan in the locker manager memory.

4. The locker system of claim 2 wherein the description of the purchased locker rights comprises a rental type and a rental duration, the rental type being one of a single access rental and a multiple access rental, the single access rental permitting the locker to be accessed only once during the rental duration, and the multiple access rental permitting the locker to be accessed more than once during the rental duration.

5. The locker system of claim 1 wherein multiple locker accounts are associated with a single rental plan.

6. The locker system of claim 1 wherein multiple external ID codes are associated with a single rental plan.

7. The locker system of claim 1 wherein the code entry device comprises at least one of a magnetic strip reader, a radio frequency identification (RFID) tag reader, a barcode reader, a keypad, and a touch screen.

8. A locker system operable with an encoded item issued to a user, each encoded item associated with an external ID code, the external ID code including a semi-unique portion and a unique portion, the semi-unique portion being a fixed sequence shared by multiple external ID codes, the unique portion being a sequence appearing in only one external ID code sharing the semi-unique portion, the external ID code originally provided to the user for a purpose other than to access the locker system, the external ID codes being associated with an external access control system in communication with a point-of-sale terminal including a code entry device allowing entry of external ID codes from the encoded items as part of a sale transaction, the locker system comprising:

a plurality of lockers, each locker comprising an enclosure, a door, and a lock, the enclosure defining an interior and an opening allowing access to the interior, the door attached to the enclosure, the door moveable between a closed position wherein the door substantially blocks the enclosure opening to inhibit access to the enclosure interior and an open position wherein the door does not block the enclosure opening thereby permitting access to the enclosure interior, the lock configured to secure the door in the closed position when engaged and release the door when disengaged, the lock being electronically actuated; and a communication module in the point-of-sale terminal generating an activation request comprising the external ID code entered during a sale of a locker right via the point-of-sale terminal and sending the activation request to a locker manager, the unique portion of the external ID code being unknown to the locker manager prior to the locker manager receiving the activation request, the activation request further comprising a description of the purchased locker right having a corresponding rental duration;

a locker manager in communication with each lock, the locker manager comprising a processor and memory, the locker manager storing validation codes in the memory, each validation code corresponding to at least a portion of one of the external ID codes, the locker manager creating an active user account associated with the external ID code from the activation request if the corresponding portion of the external ID code from the activation request matches one of the external ID codes, creating a locker account with the rental duration based on the locker right description and associating the active user account with the locker account, the user account being used to retrieve the locker account to manage access to a locker associated with the locker account when a request to access the locker is received.

9. A method of renting lockers based on external ID codes associated with encoded items issued to users, the external ID code originally provided to the user for a purpose other than to access the locker system, the external ID codes being associated with an external system, the external system including a point-of-sale terminal in communication with an access control system, the point-of-sale terminal including a code entry device allowing entry of external ID codes from the encoded items as part of an external system sales transaction that includes a sale of locker rights, the method comprising the acts of:

storing validation criteria corresponding to the external ID codes in a locker rental system;

receiving an activation request sent from the external system to the locker rental system, the activation request comprising the external ID code entered from the encoded item into the external system;

determining if the activation request is valid based on an evaluation of the external ID code from the activation request against the validation criteria stored by the locker rental system; and if the activation request is valid, storing the external ID code as an active external ID code in the locker rental system, the active external ID codes being used to determine whether to authorize access to lockers based on a comparison of the external ID code received from the locker terminal to the active external ID codes.

10. The method of claim 9 wherein the activation request is valid and further comprises a description of locker rights purchased via the external system, the method further comprising the acts of:

generating a locker account based on the description of the purchased locker rights; and storing the locker account in the locker rental system.

11. The method of claim 10 further comprising the acts of:

associating the locker account with the external ID code from the activation request to create a rental plan; and storing the rental plan in the locker rental system.

12. The method of claim 9 wherein the external ID codes include a semi-unique portion and a unique portion, the semi-unique portion being a fixed sequence shared by multiple external ID codes, the unique portion being a sequence appearing in only one external ID code sharing the same semi-unique portion, the validation criteria including validation codes correspond to the semi-unique portion of the external ID codes.

13. The method of claim 9 wherein the validation criteria include a code length or a code pattern and the act of determining if the external ID code in the access request is valid based on an evaluation of the external ID code in the access request against the validation criteria further comprises the act of accepting the external ID codes that match the code length or code pattern as valid.

14. The method of claim 9 wherein the external ID code is entered into the external system during admission to a venue associated with the external system.

15. The method of claim 9 wherein each encoded item includes a machine readable barcode, radio frequency identification (RFID) tag, or magnetic strip storing the external ID code.

16. The method of claim 9 wherein the activation request further comprises a description of the purchased locker rights.

17. The method of claim 16 wherein the description of the purchased locker rights comprises a rental type and a rental duration, the rental type being one of a single access rental and a multiple access rental, the single access rental permitting the locker to be accessed only once during the rental duration, and the multiple access rental permitting the locker to be accessed more than once during the rental duration.

* * * * *